(12) United States Patent
Bagewadi et al.

(10) Patent No.: US 7,517,235 B2
(45) Date of Patent: Apr. 14, 2009

(54) PRESS FIT CONNECTION FOR MOUNTING ELECTRICAL PLUG-IN OUTLET INSULATOR TO A BUSWAY ALUMINUM HOUSING

(75) Inventors: Sandeep P. Bagewadi, Karnataka (IN); Steven E. Richard, Selmer, TN (US); Trey Coley, Counce, TN (US); Jeffery Lynn Cox, Selmer, TN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/647,061

(22) Filed: Dec. 28, 2006

(65) Prior Publication Data
US 2008/0160812 A1 Jul. 3, 2008

(51) Int. Cl.
*H01R 13/46* (2006.01)
(52) U.S. Cl. ..................................... 439/114
(58) Field of Classification Search ............... 439/211, 439/207, 113, 114, 142
See application file for complete search history.

(56) References Cited

U.S. PATENT DOCUMENTS

| | | | |
|---|---|---|---|
| 3,571,771 A | 3/1971 | Stephanson | 335/278 |
| 3,575,684 A | 4/1971 | McIntyre | 339/42 |
| 3,632,953 A | 1/1972 | Baker | 200/84 R |
| 3,676,624 A | 7/1972 | Mauthe | 200/148 B |
| 3,710,302 A | 1/1973 | Shannon et al. | 339/22 B |
| 3,725,849 A | 4/1973 | Becke | 339/92 R |
| 3,732,523 A | 5/1973 | Fouse et al. | 339/22 B |
| 3,775,729 A | 11/1973 | Casper | 339/75 P |
| 3,777,177 A | 12/1973 | Norkum et al. | 307/118 |
| 3,787,789 A | 1/1974 | Harris | 335/193 |
| 3,882,265 A | 5/1975 | Johnston et al. | 174/88 |
| 3,902,028 A | 8/1975 | Tremain | 200/81 |
| 3,904,926 A | 9/1975 | Brown | 315/378 |
| 3,908,235 A * | 9/1975 | Telliard et al. | 411/508 |
| 3,910,672 A | 10/1975 | Frantz | 339/97 P |
| 3,912,357 A | 10/1975 | Zahaykevich | 339/198 M |
| 3,916,130 A | 10/1975 | Cade | 200/83 C |
| 3,922,053 A | 11/1975 | Hafer | 339/22 B |
| 3,980,370 A | 9/1976 | Gonzalez-Hernandez | 339/40 |
| 4,047,787 A | 9/1977 | Gumb et al. | 339/154 A |
| 4,050,768 A | 9/1977 | Gumb | 339/154 A |
| 4,061,411 A | 12/1977 | Gumb et al. | 339/159 A |
| 4,063,110 A | 12/1977 | Glick | 307/112 |
| 4,085,988 A | 4/1978 | Gamble | 339/14 R |
| 4,097,103 A | 6/1978 | Krause | 339/22 B |
| 4,179,180 A | 12/1979 | Hanna | 339/189 R |
| 4,202,593 A | 5/1980 | Abernathy et al. | 339/125 R |
| 4,224,592 A | 9/1980 | Urani et al. | 337/198 |
| 4,241,974 A | 12/1980 | Hardesty | 339/154 A |

(Continued)

FOREIGN PATENT DOCUMENTS

DE 19700514 7/1998

(Continued)

*Primary Examiner*—Phuong K Dinh
(74) *Attorney, Agent, or Firm*—Ohlandt, Greeley, Ruggiero & Perle, L.L.P.

(57) ABSTRACT

A molded plastic outlet box for electric busway systems comprising: a molded plastic base comprising a plurality of press-fit tabs for attachment of the base to a housing of the electric busway system disposed about a bottom surface of the base.

7 Claims, 4 Drawing Sheets

U.S. PATENT DOCUMENTS

| | | | | |
|---|---|---|---|---|
| 4,245,873 A | 1/1981 | Markowitz | | 339/9 R |
| 4,260,973 A | 4/1981 | Berthel et al. | | 335/133 |
| 4,295,702 A | 10/1981 | Snyder | | 339/97 P |
| 4,296,398 A | 10/1981 | McGalliard | | 337/297 |
| 4,300,073 A | 11/1981 | Skwirut et al. | | 315/53 |
| 4,320,369 A | 3/1982 | Bukala | | 335/202 |
| 4,342,977 A | 8/1982 | McGalliard | | 337/4 |
| 4,376,927 A | 3/1983 | McGalliard | | 337/297 |
| 4,394,639 A | 7/1983 | McGalliard | | 337/292 |
| 4,457,633 A | 7/1984 | Andrews | | 374/209 |
| 4,460,847 A | 7/1984 | Englehardt | | 315/58 |
| 4,463,228 A | 7/1984 | Osika | | 200/51 R |
| 4,463,235 A | 7/1984 | Gentric et al. | | 200/175 |
| 4,465,331 A | 8/1984 | Masuda et al. | | 339/14 R |
| 4,476,412 A | 10/1984 | Nishida et al. | | 313/130 |
| 4,479,688 A | 10/1984 | Jennings | | 339/37 |
| 4,480,212 A | 10/1984 | Monahan et al. | | 315/71 |
| 4,480,887 A | 11/1984 | Morelli | | 339/94 C |
| 4,482,618 A | 11/1984 | Orsino et al. | | 429/179 |
| 4,482,789 A | 11/1984 | McVey | | 200/44 |
| 4,485,282 A | 11/1984 | Lee | | 200/51 R |
| 4,487,466 A | 12/1984 | Petit et al. | | 339/32 M |
| 4,488,764 A | 12/1984 | Pfenning et al. | | 339/37 |
| 4,491,378 A | 1/1985 | Crawford | | 339/75 MP |
| 4,494,815 A | 1/1985 | Brzostek et al. | | 339/123 |
| 4,495,443 A | 1/1985 | Cummings | | 315/58 |
| 4,497,532 A | 2/1985 | Bezusko et al. | | 339/112 R |
| 4,500,158 A | 2/1985 | Dola | | 339/122 R |
| 4,500,160 A | 2/1985 | Bertsch | | 339/166 R |
| 4,500,862 A | 2/1985 | Shedd | | 337/32 |
| 4,509,107 A | 4/1985 | Malinowski | | 362/267 |
| 4,514,713 A | 4/1985 | van Dam | | 336/96 |
| 4,519,784 A | 5/1985 | Pollner | | 445/7 |
| 4,522,455 A | 6/1985 | Johnson | | 339/14 R |
| 4,530,562 A | 7/1985 | Reynolds, Jr. | | 339/191 R |
| 4,531,794 A | 7/1985 | Heverly | | 339/39 |
| 4,531,800 A | 7/1985 | Avener | | 339/75 P |
| 4,536,050 A | 8/1985 | Hung | | 339/99 R |
| 4,538,871 A | 9/1985 | Li | | 339/75 M |
| 4,540,910 A | 9/1985 | Kondo et al. | | 313/11.5 |
| 4,545,631 A | 10/1985 | Zampini | | 339/14 R |
| 4,545,637 A | 10/1985 | Bosshard et al. | | 339/177 |
| 4,547,030 A | 10/1985 | Tanner et al. | | 339/21 R |
| 4,549,114 A | 10/1985 | Herden | | 315/58 |
| 4,549,778 A | 10/1985 | Price et al. | | 339/40 |
| 4,553,798 A | 11/1985 | Murphy | | 339/9 R |
| 4,563,049 A | 1/1986 | Thibeault | | 339/83 |
| 4,565,417 A | 1/1986 | Duessel et al. | | 339/34 C |
| 4,566,744 A | 1/1986 | v. Engelenburg et al. | | 339/8 L |
| 4,577,920 A | 3/1986 | Coldren et al. | | 339/143 R |
| 4,578,593 A | 3/1986 | Davidov | | 307/113 |
| 4,586,765 A | 5/1986 | Ban | | 339/44 R |
| 4,588,901 A | 5/1986 | Maclay et al. | | 307/141 |
| 4,615,113 A | 10/1986 | Fennel | | 29/874 |
| 4,627,680 A | 12/1986 | Weimer et al. | | 339/22 B |
| 4,652,069 A | 3/1987 | Smith | | 339/75 P |
| 4,653,834 A | 3/1987 | Norden | | 339/125 R |
| 4,662,701 A | 5/1987 | Lane | | 339/176 M |
| 4,679,126 A | 7/1987 | Van Sickler | | 362/226 |
| 4,693,531 A | 9/1987 | Raphal et al. | | 439/512 |
| 4,731,599 A | 3/1988 | Pressinger | | 336/84 C |
| 4,735,576 A | 4/1988 | Tanaka et al. | | 439/92 |
| 4,759,729 A | 7/1988 | Kemppainen et al. | | 439/580 |
| 4,768,965 A | 9/1988 | Chang | | 439/137 |
| 4,820,177 A | 4/1989 | Slicer | | 439/207 |
| 4,820,178 A | 4/1989 | Anderson et al. | | 439/212 |
| 4,856,999 A | 8/1989 | Flohr | | 439/52 |
| 4,864,156 A | 9/1989 | Tigges et al. | | 307/117 |
| 4,867,694 A | 9/1989 | Short | | 439/137 |
| 4,871,317 A | 10/1989 | Jones | | 439/68 |
| 4,872,847 A | 10/1989 | Fennell et al. | | 439/133 |
| 4,895,227 A | 1/1990 | Grenier et al. | | 188/173 |
| 4,915,639 A | 4/1990 | Cohn et al. | | 439/188 |
| 4,934,962 A | 6/1990 | Luu et al. | | 439/651 |
| 4,952,164 A | 8/1990 | French et al. | | 439/215 |
| 4,952,168 A | 8/1990 | Schieferly et al. | | 439/467 |
| 4,957,447 A | 9/1990 | Hibbert et al. | | 439/207 |
| 4,990,821 A | 2/1991 | Blaisdell et al. | | 313/112 |
| 5,019,829 A | 5/1991 | Heckman et al. | | 343/700 MS |
| 5,035,641 A | 7/1991 | Van-Santbrink et al. | | 439/329 |
| 5,108,311 A | 4/1992 | Nakazawa | | 439/607 |
| 5,112,245 A | 5/1992 | Shimirak et al. | | 439/412 |
| 5,122,072 A | 6/1992 | Arn et al. | | 439/210 |
| 5,144,188 A | 9/1992 | Kagawa et al. | | 313/11.5 |
| 5,145,393 A | 9/1992 | Schoon | | 439/269 |
| 5,153,552 A | 10/1992 | Krasser | | 337/66 |
| 5,154,508 A | 10/1992 | Ahroni | | 362/226 |
| 5,159,232 A | 10/1992 | Sato et al. | | 313/141 |
| 5,159,233 A | 10/1992 | Sponseller et al. | | 313/141 |
| 5,160,280 A | 11/1992 | Chuang | | 439/675 |
| 5,160,879 A | 11/1992 | Tortola et al. | | 320/2 |
| 5,163,838 A | 11/1992 | Tura, Jr. et al. | | 439/126 |
| 5,165,042 A | 11/1992 | Klinger | | 174/67 |
| 5,167,514 A | 12/1992 | Suzuki et al. | | 439/108 |
| 5,249,976 A | 10/1993 | Brock | | 439/102 |
| 5,256,087 A | 10/1993 | Hendel | | 439/741 |
| 5,256,873 A | 10/1993 | Turner et al. | | 250/239 |
| RE34,532 E | 2/1994 | Luu et al. | | 439/651 |
| 5,349,146 A | 9/1994 | Radabaugh | | 200/61.6 |
| 5,354,215 A | 10/1994 | Viracola | | 439/500 |
| 5,358,883 A | 10/1994 | Burger et al. | | 437/32 |
| 5,378,162 A | 1/1995 | Waible | | 439/106 |
| 5,382,170 A | 1/1995 | Imanishi | | 439/127 |
| 5,383,799 A | 1/1995 | Fladung | | 439/652 |
| 5,385,478 A | 1/1995 | Niekawa | | 439/67 |
| 5,385,859 A | 1/1995 | Enomoto | | 437/52 |
| 5,389,803 A | 2/1995 | Mohammad | | 257/197 |
| 5,394,315 A | 2/1995 | Ahroni | | 362/226 |
| 5,401,906 A | 3/1995 | Bryant | | 174/88 B |
| 5,409,388 A | 4/1995 | Phillips, Jr. et al. | | 439/125 |
| 5,415,557 A * | 5/1995 | Chapman et al. | | 439/142 |
| 5,420,052 A | 5/1995 | Morris et al. | | 437/31 |
| 5,429,958 A | 7/1995 | Matlock | | 437/34 |
| 5,434,741 A | 7/1995 | Mulkins et al. | | 361/253 |
| 5,451,819 A | 9/1995 | Koyama | | 257/758 |
| 5,459,643 A | 10/1995 | Sieman et al. | | 361/785 |
| 5,466,165 A | 11/1995 | Boesel et al. | | 439/142 |
| 5,503,565 A | 4/1996 | McCoy | | 439/171 |
| 5,505,630 A | 4/1996 | Petrisko et al. | | 439/137 |
| 5,508,582 A | 4/1996 | Sugimoto et al. | | 313/118 |
| 5,509,818 A | 4/1996 | Lai | | 439/188 |
| 5,515,023 A | 5/1996 | Marach et al. | | 337/213 |
| 5,518,948 A | 5/1996 | Walker | | 437/60 |
| 5,521,566 A | 5/1996 | Krubsack et al. | | 335/126 |
| 5,521,932 A | 5/1996 | Marshall | | 372/36 |
| 5,525,068 A * | 6/1996 | Graham et al. | | 439/114 |
| 5,525,888 A | 6/1996 | Toya | | 320/2 |
| 5,535,089 A | 7/1996 | Ford et al. | | 361/231 |
| 5,547,893 A | 8/1996 | Sung | | 437/52 |
| 5,612,658 A | 3/1997 | Hendel et al. | | 335/78 |
| 5,637,017 A | 6/1997 | Hsu | | 439/622 |
| 5,647,755 A | 7/1997 | Hida et al. | | 439/328 |
| 5,654,216 A | 8/1997 | Adrian | | 438/627 |
| 5,707,251 A | 1/1998 | Sakai et al. | | 439/589 |
| 5,716,881 A | 2/1998 | Liang et al. | | 438/238 |
| 5,716,883 A | 2/1998 | Tseng | | 438/253 |
| 5,719,363 A | 2/1998 | Haendler | | 200/50.02 |
| 5,771,151 A | 6/1998 | Hotea et al. | | 361/626 |
| 5,799,633 A | 9/1998 | Miller | | 123/143 |
| 5,807,786 A | 9/1998 | Chang | | 438/600 |
| 5,808,533 A | 9/1998 | Buecher et al. | | 335/202 |
| 5,821,681 A | 10/1998 | Wynn | | 313/318.01 |
| 5,842,892 A | 12/1998 | Heimueller et al. | | 439/752 |
| 5,885,103 A | 3/1999 | Ernolf et al. | | 439/579 |

| Patent No. | Date | Inventor | Class |
|---|---|---|---|
| 5,895,279 A | 4/1999 | Petrisko et al. | 439/114 |
| 5,895,985 A | 4/1999 | Fischer | 307/116 |
| 5,989,052 A | 11/1999 | Fields et al. | 439/373 |
| 6,010,942 A | 1/2000 | Chien et al. | 438/396 |
| 6,015,733 A | 1/2000 | Lee et al. | 438/253 |
| 6,039,594 A | 3/2000 | Zuppa | 439/318 |
| 6,059,614 A | 5/2000 | Shelby et al. | 439/717 |
| 6,060,386 A | 5/2000 | Givens | 438/626 |
| 6,068,526 A | 5/2000 | Nottrott et al. | 439/845 |
| 6,080,664 A | 6/2000 | Huang et al. | 438/638 |
| 6,083,014 A | 7/2000 | Bogden et al. | 439/98 |
| 6,100,137 A | 8/2000 | Chen et al. | 438/253 |
| 6,143,617 A | 11/2000 | Shue et al. | 438/396 |
| 6,155,855 A | 12/2000 | Weil et al. | 439/189 |
| 6,168,984 B1 | 1/2001 | Yoo et al. | 438/239 |
| 6,183,264 B1 | 2/2001 | Harsanyi | 439/38 |
| 6,231,377 B1 | 5/2001 | Fernsebner | 439/493 |
| 6,244,888 B1 | 6/2001 | Cappe | 439/341 |
| 6,244,894 B1 | 6/2001 | Miyashita | 439/500 |
| 6,254,408 B1 | 7/2001 | Hattori et al. | 439/157 |
| 6,273,750 B1 | 8/2001 | Malkowski, Jr. | 439/499 |
| 6,277,517 B1 | 8/2001 | Thomas et al. | 429/175 |
| 6,280,203 B1 | 8/2001 | Smirra | 439/77 |
| 6,280,215 B1 | 8/2001 | Rice | 439/230 |
| 6,303,952 B1 | 10/2001 | Aoki et al. | 257/295 |
| 6,325,646 B1 | 12/2001 | Uemura et al. | 439/131 |
| 6,350,135 B1 * | 2/2002 | Acklin et al. | 439/211 |
| 6,361,340 B1 | 3/2002 | Robbins et al. | 439/173 |
| 6,364,682 B1 | 4/2002 | Cappe | 439/341 |
| 6,368,161 B1 | 4/2002 | Lin | 439/699.2 |
| 6,375,490 B1 * | 4/2002 | Yao | 439/417 |
| 6,376,895 B2 | 4/2002 | Farrar et al. | 257/531 |
| 6,377,156 B2 | 4/2002 | Farrar et al. | 336/200 |
| 6,413,104 B1 | 7/2002 | Bernardini | 439/133 |
| 6,448,519 B1 | 9/2002 | Rane et al. | 200/293 |
| 6,461,959 B1 | 10/2002 | Chien et al. | 438/672 |
| 6,492,888 B2 | 12/2002 | Dahl et al. | 335/202 |
| 6,509,209 B1 | 1/2003 | Shroff et al. | 438/131 |
| 6,514,105 B2 | 2/2003 | Lin | 439/699.2 |
| 6,518,120 B2 | 2/2003 | Park | 438/244 |
| 6,527,570 B1 | 3/2003 | Hartman et al. | 439/180 |
| 6,533,598 B1 | 3/2003 | Bentley et al. | 439/346 |
| 6,565,389 B1 | 5/2003 | Igarashi | 439/660 |
| 6,566,241 B2 | 5/2003 | Chun | 438/618 |
| 6,575,782 B2 | 6/2003 | Berberich et al. | 439/535 |
| 6,580,144 B2 | 6/2003 | Anthony | 257/529 |
| 6,586,314 B1 | 7/2003 | Siah et al. | 438/424 |
| 6,590,252 B2 | 7/2003 | Kutsunai et al. | 257/310 |
| 6,614,145 B2 | 9/2003 | Fleetwood et al. | 313/141 |
| 6,616,472 B2 | 9/2003 | Lee | 439/342 |
| 6,619,981 B2 | 9/2003 | Neiser | 439/501 |
| 6,620,685 B2 | 9/2003 | Oh | 438/257 |
| 6,623,296 B2 | 9/2003 | Okamoto | 439/536 |
| 6,634,896 B1 | 10/2003 | Potega | 439/218 |
| 6,635,838 B1 | 10/2003 | Kornelson | 200/341 |
| 6,636,051 B2 | 10/2003 | Pade | 324/538 |
| 6,638,083 B2 | 10/2003 | Rhude | 439/142 |
| 6,642,450 B2 | 11/2003 | Hsiao | 174/53 |
| 6,649,508 B1 | 11/2003 | Park et al. | 438/618 |
| 6,664,477 B2 | 12/2003 | Fortin | 174/138 F |
| 6,667,209 B2 | 12/2003 | Won et al. | 438/253 |
| 6,667,226 B2 | 12/2003 | Pinto et al. | 438/524 |
| 6,667,568 B1 | 12/2003 | Bugaets | 313/143 |
| 6,669,491 B2 | 12/2003 | Yoji | 439/106 |
| 6,670,238 B2 | 12/2003 | Deboer et al. | 438/255 |
| 6,670,740 B2 | 12/2003 | Landon, Jr. | 313/141 |
| 6,677,220 B2 | 1/2004 | Van Brocklin et al. | 438/467 |
| 6,692,284 B1 | 2/2004 | Koh | 439/346 |
| 6,705,880 B2 | 3/2004 | Rhude | 439/144 |
| 6,750,566 B2 | 6/2004 | Goers et al. | 307/134 |
| 6,767,228 B2 | 7/2004 | Katz | 439/140 |
| 6,770,557 B2 | 8/2004 | Nakata | 438/627 |
| 6,776,648 B1 | 8/2004 | Hernando | 439/476.1 |
| 6,780,031 B1 | 8/2004 | Valls | 439/147 |
| 6,784,778 B2 | 8/2004 | Stitz et al. | 336/90 |
| 6,814,611 B1 | 11/2004 | Torres | 439/535 |
| 6,815,339 B2 | 11/2004 | Choi | 438/634 |
| 6,832,926 B2 | 12/2004 | Rudolph et al. | 439/345 |
| 6,835,104 B2 | 12/2004 | West et al. | 439/709 |
| 6,848,919 B2 | 2/2005 | Stitz et al. | 439/130 |
| 6,851,965 B1 | 2/2005 | Czabanski et al. | 439/391 |
| 6,863,538 B2 | 3/2005 | Mattern et al. | 439/35 |
| 6,863,566 B2 | 3/2005 | Scheuerer | 439/587 |
| 6,867,373 B2 | 3/2005 | West et al. | 174/101 |
| 2001/0016409 A1 | 8/2001 | Farrar et al. | 438/619 |
| 2001/0024153 A1 | 9/2001 | Farrar et al. | 336/200 |
| 2001/0025773 A1 | 10/2001 | Rane et al. | 200/50.21 |
| 2002/0009927 A1 | 1/2002 | Berberich et al. | 439/625 |
| 2002/0011790 A1 | 1/2002 | Holzer | 315/56 |
| 2002/0039861 A1 | 4/2002 | Lin | 439/699.2 |
| 2002/0053963 A1 | 5/2002 | Dahl et al. | 335/202 |
| 2002/0063048 A1 | 5/2002 | Rane et al. | 200/293 |
| 2002/0076973 A1 | 6/2002 | Smirra et al. | 439/446 |
| 2002/0137391 A1 | 9/2002 | Berberich et al. | 439/620 |
| 2002/0182907 A1 | 12/2002 | Katz | 439/140 |
| 2003/0008498 A1 | 1/2003 | Nakata | 438/637 |
| 2003/0092297 A1 | 5/2003 | Reindle et al. | 439/107 |
| 2003/0148636 A1 | 8/2003 | Henry et al. | 439/10 |
| 2003/0173592 A1 | 9/2003 | Brocklin et al. | 257/200 |
| 2003/0186564 A1 | 10/2003 | Rhude | 439/35 |
| 2003/0232532 A1 | 12/2003 | West et al. | 439/12 |
| 2004/0002212 A1 | 1/2004 | Choi | 438/687 |
| 2004/0009700 A1 | 1/2004 | Patel | 439/488 |
| 2004/0027825 A1 | 2/2004 | Wunsch | 362/226 |
| 2004/0082226 A1 | 4/2004 | Schulte et al. | 439/638 |
| 2004/0102101 A1 | 5/2004 | Scheuerer | 439/682 |
| 2004/0104795 A1 | 6/2004 | Stitz et al. | 336/65 |
| 2004/0183650 A1 | 9/2004 | Stitz et al. | 338/192 |
| 2004/0195586 A1 | 10/2004 | Suzuki | 257/197 |
| 2004/0235334 A1 | 11/2004 | Kim | 439/381 |
| 2005/0037590 A1 | 2/2005 | Inoue et al. | 438/396 |
| 2005/0057926 A1 | 3/2005 | McCoy | 362/226 |

FOREIGN PATENT DOCUMENTS

| | | |
|---|---|---|
| DE | 19856691 | 6/2000 |
| DE | 10019760 | 3/2001 |
| DE | 10052619 | 3/2002 |
| EP | 0126316 | 11/1984 |
| EP | 0251035 | 1/1985 |
| EP | 0158845 | 10/1985 |
| EP | 0333988 | 9/1989 |
| EP | 0337332 | 10/1989 |
| EP | 0385202 | 9/1990 |
| EP | 0390006 | 10/1990 |
| EP | 0394804 | 10/1990 |
| EP | 0413241 | 2/1991 |
| EP | 0432286 | 6/1991 |
| EP | 0477663 | 4/1992 |
| EP | 0477664 | 4/1992 |
| EP | 0477856 | 4/1992 |
| EP | 0487360 | 5/1992 |
| EP | 0496977 | 8/1992 |
| EP | 0528735 | 2/1993 |
| EP | 0545015 | 6/1993 |
| EP | 0549083 | 6/1993 |
| EP | 0554045 | 8/1993 |
| EP | 0599730 | 5/1994 |
| EP | 0660444 | 6/1995 |
| EP | 0713233 | 5/1996 |
| EP | 0841726 | 5/1998 |
| EP | 0859431 | 8/1998 |
| EP | 0865049 | 9/1998 |
| EP | 0880204 | 11/1998 |
| EP | 0896407 | 2/1999 |
| EP | 0913886 | 5/1999 |

| | | | | | | |
|---|---|---|---|---|---|---|
| EP | 0921604 | 6/1999 | | EP | 1298729 | 4/2003 |
| EP | 0921605 | 6/1999 | | EP | 1304783 | 4/2003 |
| EP | 0923172 | 6/1999 | | EP | 1385237 | 1/2004 |
| EP | 0987795 | 3/2000 | | EP | 1441427 | 7/2004 |
| EP | WO00/16447 | 3/2000 | | EP | 1453145 | 9/2004 |
| EP | 1009081 | 6/2000 | | EP | 0618647 | 10/2004 |
| EP | 1011144 | 6/2000 | | EP | 0619628 | 10/2004 |
| EP | 1014510 | 6/2000 | | EP | 1507275 | 2/2005 |
| EP | 1017119 | 7/2000 | | WO | WO88/09058 | 11/1988 |
| EP | 1028465 | 8/2000 | | WO | WO93/26030 | 12/1993 |
| EP | 1030361 | 8/2000 | | WO | WO94/18689 | 8/1994 |
| EP | 1032087 | 8/2000 | | WO | WO95/06342 | 3/1995 |
| EP | 1022829 | 9/2000 | | WO | WO95/30995 | 11/1995 |
| EP | 1033758 | 9/2000 | | WO | WO96/32762 | 10/1996 |
| EP | 1120865 | 8/2001 | | WO | WO97/15962 | 5/1997 |
| EP | 1208618 | 5/2002 | | WO | WO97/49145 | 12/1997 |
| EP | 1261025 | 11/2002 | | WO | WO98/00887 | 1/1998 |
| EP | 1271724 | 1/2003 | | WO | WO98/11597 | 3/1998 |
| EP | 1271725 | 1/2003 | | WO | WO99/16153 | 4/1999 |
| EP | 1298727 | 4/2003 | | | | |

* cited by examiner

PRESS FIT CONNECTION FOR MOUNTING ELECTRICAL PLUG-IN OUTLET INSULATOR TO A BUSWAY ALUMINUM HOUSING

BACKGROUND

1. Field

The present disclosure generally relates to molded plastic outlet boxes which are attached to an electric busway power distribution system at each location along the system, wherein the outlet boxes comprise press fit connectors for connecting each outlet box to an aluminum housing of the electric busway. Preferably, each outlet box include wings on each side thereof to provide a snap-fit retention against the side walls of the aluminum busway housing.

2. Discussion of the Background Art

Electric busway distribution systems comprise a plurality of rectangular bus bar conductors arranged within a metallic housing for providing electric power to industrial buildings. Every two feet or so, the bus bars are provided with upstanding contact blades to allow for connection with a power take-off assembly. One such power distribution system is described within U.S. Pat. No. 4,758,172 filed Oct. 13, 1987 entitled "Power Distribution Busway System". This patent application describes contact blades extending from the individual phases of a multi-phase power distribution system that are arranged for electrical connection with a power take-off assembly. In this arrangement, the contact blades are formed from the bus bar conductors themselves. U.S. patent application Ser. No. 203,751 entitled "Insulated Electrical Power Distribution Busway Tabs" describes the use of off-set tabs welded to the individual bus bars to provide the stabs for connecting with power take-off assemblies. U.S. patent application Ser. No. 122,863 filed Nov. 19, 1987 entitled "Thermally Efficient Power Busway Housing" describes a power busway housing design that is used with the molded case outlet box of the instant invention. All of the aforementioned U.S. patent applications are incorporated herein for purposes of reference.

U.S. Pat. No. 4,714,431 entitled "Electrical Distribution System Having an Improved Plug-In Assembly for Current Tap-Off" describes the bus bar conductors that are spaced apart at periodic intervals for the insertion of the receiver stabs. The base portion of the plug-in assembly includes insulating means extending between the individual bus bars for electric isolation.

U.S. Pat. No. 4,820,178, which is incorporated herein by reference in its entirety discloses a conventional outlet box for use with an electric busway system which affixed to the aluminum housing via four (4) screws. FIG. 1 describes such a conventions electric busway system, wherein the bus conductors 11 of the type consisting of a rectangular bar 12 of aluminum or copper are each provided with an electrically insulating epoxy coating 13 and are arranged within a continuous housing 14 consisting of first and second side frames 15, 16 which support the bus bars as well as provide ground conduction to the busway section. The bus bars are not "bumped" or otherwise separated at each plug-in section as indicated at 7 and 8 herein to facilitate connection with a power take-off assembly (not shown). Instead, welded contact blade tabs such as 20-23 are off-set from each other to accommodate connection with the power take-off assemblies. The contact blade tabs that are welded to the individual bus bars and the epoxy coating is removed from a part of the tabs to provide good electrical connection therewith. The contact blade tabs extend above the cross-piece 18 that joins the upstanding rails 17 on the first and second side frames 15, 16 that make up the busway section 10 through corresponding cross-piece slots 19. The busway sections and bus bars are fastened together by means of thru-bolts 9 provided through the busway section where the plug-in sections 7, 8 are located. In order to electrically isolate the upstanding contact blade tabs 20-23, a molded plastic plug-in enclosure 6 is arranged over the contact blade tabs by means of threaded openings 26 formed on the cross-piece 18 and by means of bolts or screws 24 and thru-holes 25. One such molded plastic plug-in enclosure already attached to the plug-in section 8 is depicted at 6' to indicate the electrical isolation of the contact blade tabs 20-23 therein. The plug-in enclosure 6 consists of a molded plastic base 27 formed from a phenylene-oxide plastic sold by General Electric Company under the trademark "NORYL" or a polybutylene terepthalate which is sold under the General Electric trademark "Valox". The base is molded to include a planar bottom, not shown, through which the thru-holes 25 are formed. Also formed within the planar top are opposing channels, not shown, which accommodate a ground lug that is separately attached to the busway section 10 along the cross-piece 18. A molded plastic cover 40, which includes a planar top portion 40A and downwardly depending side portions 40B and 40C, is attached to the base 27 by means of a pivot post 41 integrally formed therein and extending between a pair of tabs 42, 43. The cover is attached to the base by positioning the pivot post 41 under a pair of curvilinear projections 32 extending from the planar top 33.

The above busway plug-in outlet insulator utilizes four screws or bolts 24 to mount the outlet to aluminum housing or busway 10. Such mechanical mounting of the outlet to the housing or busway via screws or bolts is very disadvantageous and requires a substantial increase in manufacturing labor and materials. The present disclosure overcomes these disadvantages by providing a easy mounting devices to allow for rapid and cost effective mounting of the outlet to the housing or busway, without the need for extensive labor required by conventional systems to screw mount the outlet via four (4) bolts.

The present disclosure also provides many additional advantages, which shall become apparent as described below.

SUMMARY

A molded plastic outlet box for electric busway systems comprising: a molded plastic base comprising a plurality of press-fit tabs for attachment of said base to a housing of said electric busway system disposed about a bottom surface of said base. Preferably, the press-fit tabs are integrally molded together with said outlet box. The press-fit tabs are typically disposed about the four corners of said base.

The press-fit tabs are disposed perpendicular to said base towards said housing, and wherein said housing includes thru-holes for securably receiving said press-fit tabs. Preferably, the press-fit tab comprising a post and an end tab for securably affixing said outlet box to said housing.

Optionally, the base of the outlet box comprises a plurality of press-fit wings disposed on opposite sides of said base so that they are positioned adjacent to oppositely disposed sidewalls of said housing.

Furthermore, the base comprises a planar surface at a top surface thereof, said planar surface having a plurality of slots extending therethrough coextensive with associated bus bar contact blades extending from said busway system, said base further including a pair of side members extending downwardly from said planar surface.

The base preferably includes a molded plastic cover hingably and removably attached to one end of said top surface thereof by a hinge pin; and a pair of first arcuate projections integrally formed on said top surface at said one end, said hinge pin being trapped under said first arcuate projections in press-fit relation therewith for holding said cover in an open position on said one end of said top surface.

It is also an embodiment according to the present invention, wherein a gasket is disposed between said base of said outlet box and an adjacent surface of said housing to provide drip-proofing and/or splash-proofing for required applications.

Further objects, features and advantages of the present disclosure will be understood by reference to the following drawings and detailed description.

DETAILED DESCRIPTION OF THE PREFERRED EMBODIMENT

Figure 1:
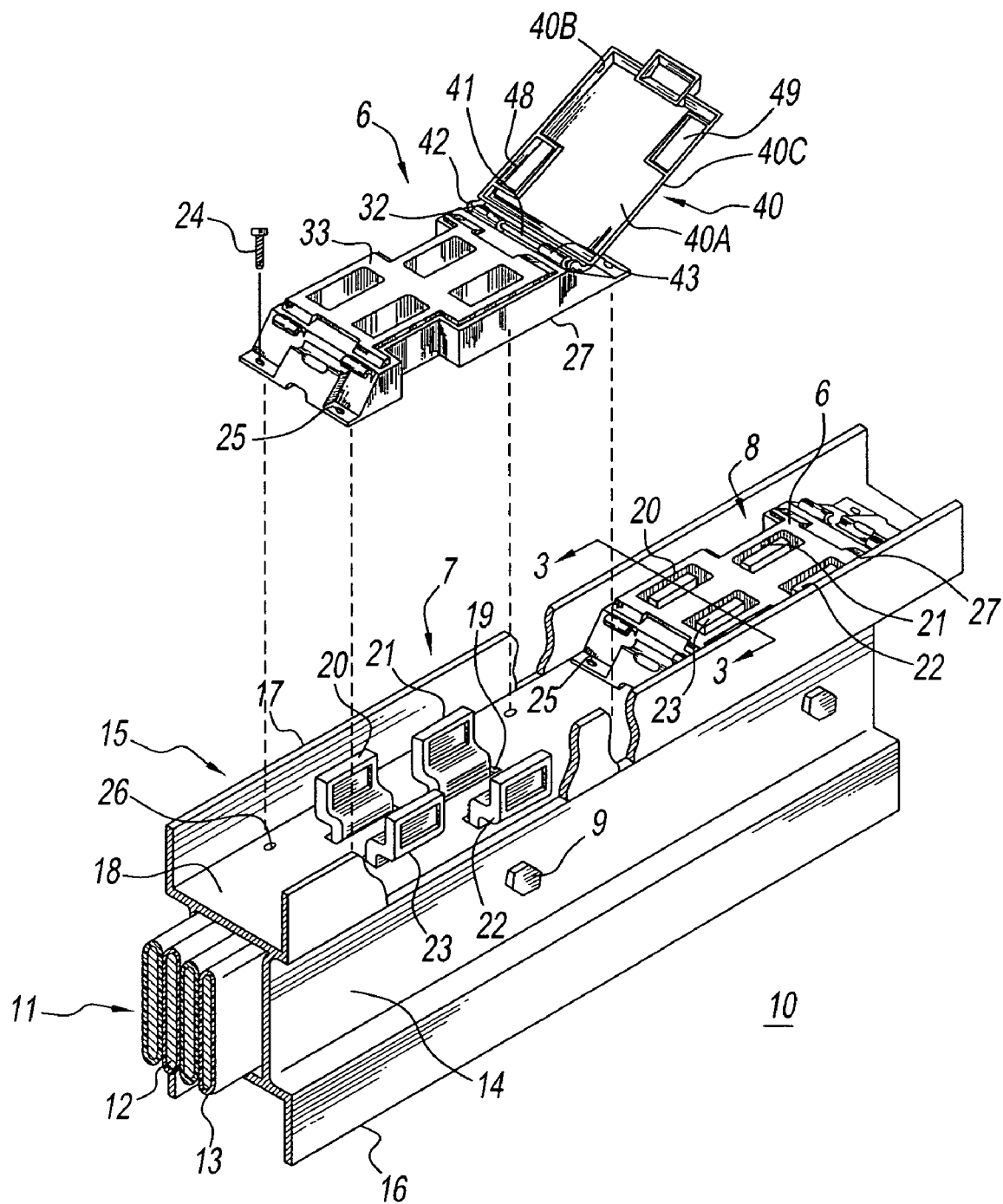
FIG. 1 is an exploded right side perspective view of a conventional outlet box mounted on an electric busway according to the prior art.
Figure 2:
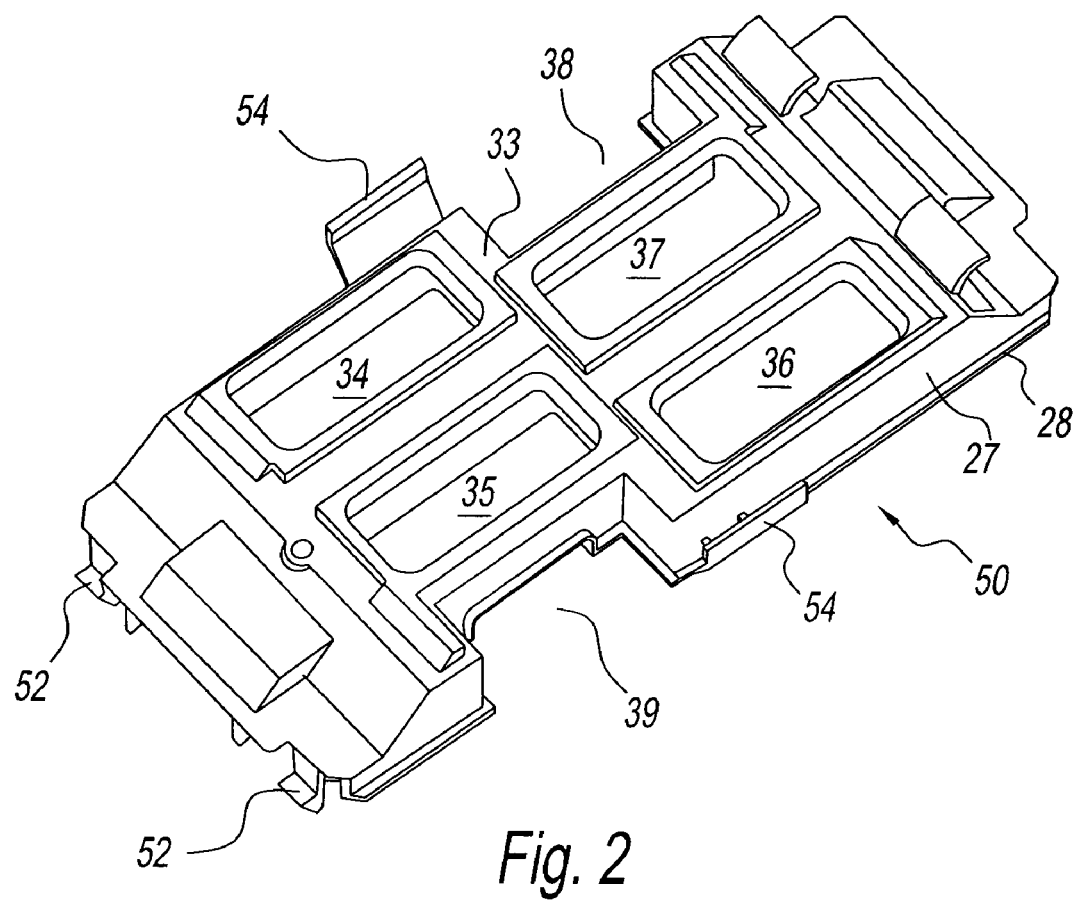
FIG. 2 is top right side perspective view of an outlet box according to the present disclosure depicting the side mounted press-fit wings.

The present disclosure can best be describe by reference to the figures, wherein FIGS. 2-6 include plug-in outlet box 50 as depicted in FIG. 2 includes a molded plastic base 27 formed from a phenylene-oxide plastic sold by General Electric Company under the trademark "NORYL" or a polybutylene terepthalate which is sold under the General Electric trademark "Valox". The base is molded to include a planar bottom 28 to which press-fit tabs 52 are preferable molded perpendicular thereto for securing to outlet box 50 to a busway aluminum housing, not shown. A planar top portion 33 defines a plurality of rectangular slots 34-37 that are off-set from each other to accommodate the upstanding contact blade tabs, not shown. Also formed within the planar top 33 are opposing channels 38, 39 which accommodate a ground lug that is separately attached to the busway section along the cross-piece 18 described earlier with reference to FIG. 1. A molded plastic cover 40, which includes a planar top portion 40A and downwardly depending side portions 40B and 40C, is attached to the base 27 by means of a pivot post 41 integrally formed therein and extending between a pair of tabs 42, 43, as shown in FIG. 1. The cover is attached to the base by positioning the pivot post 41 under a pair of curvilinear projections 32 extending from the planar top 33. A clearance slot 44 is defined between the pivot post 41 and the planar surface 40A of the cover to allow for the insertion of the curvilinear projections.

Preferably plug-in outlet box 50 includes side mounted press-fit wings 54 which allow for box 50 to be press-fit within the busway aluminum housing. Press-fit wings 54 may be formed from any material, but preferably is a plastic material which allows it to single form molded together with outlet box 50 and allows for flexible mounting to the busway aluminum housing. Similarly, press-fit tabs 52 can be the same or different material as outlet box 50 and/or press-fit wings 54. Tabs 52 are preferably formed perpendicular to planar top 33 of outlet box 50 having a rectangularly shaped post 55 with a securing means or locking tab 56 disposed about the end of post 55 opposite to planar top 33, as best show in the cut-out of FIG. 5. Press-fit wings 54 are disposed along planar bottom 28 of outlet box 50 upwards at an angle adequate to secure to aluminum housing (14), with bent 58 portion at the outer edge thereof.

Figure 4:
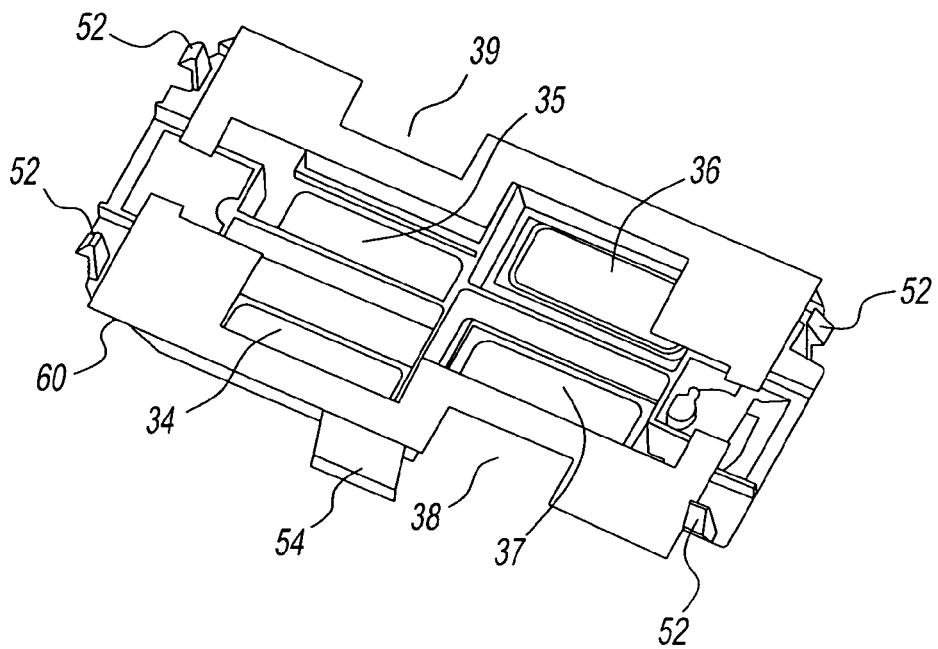
FIG. 4 is a bottom left side perspective view of the outlet box of FIG. 2 with insulation disposed thereabout.
Figure 5:
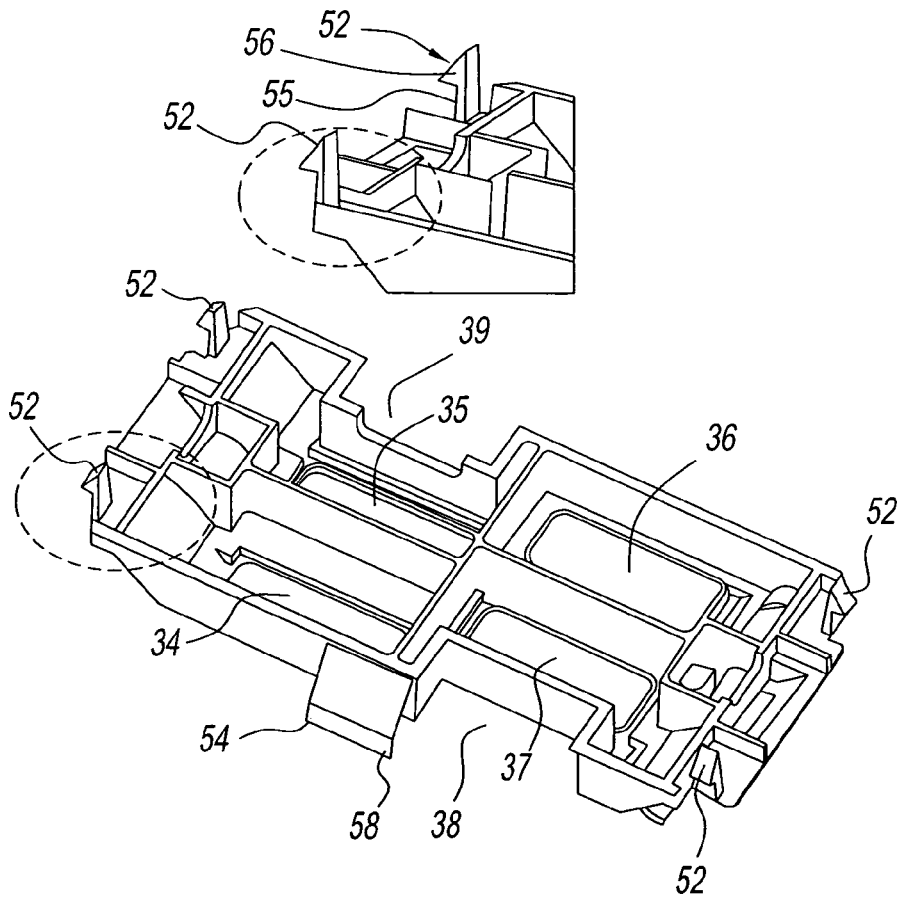
FIG. 5 is a bottom left side perspective view of the outlet box of FIG. 2 without insulation depicting both the side mounted press-fit wings and four press-fit tabs disposed about the four corners thereof, together with a portion view of the left side tabs.
Figure 6:
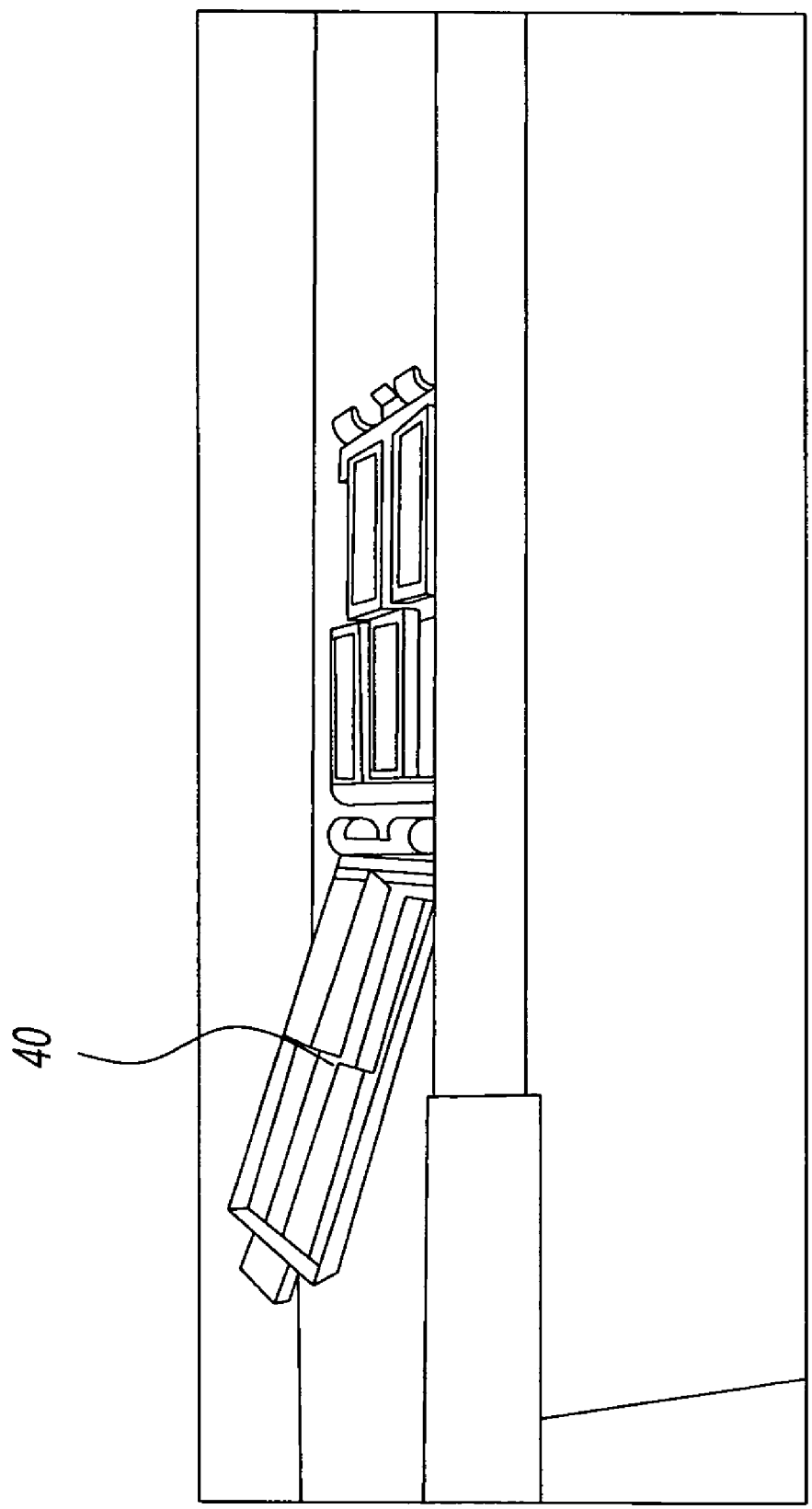
FIG. 6 is a front top perspective view of an outlet box according to the present disclosure mounted within a busway aluminum housing with a top door affixed thereto.

Optionally, an insulating gasket 60 as show in FIG. 4, can be disposed on the bottom portion of outlet box 50 to interface with the busway housing for splash proof and drip-proof applications. For indoor applications no gasket 60 is typically required.

Figure 3:
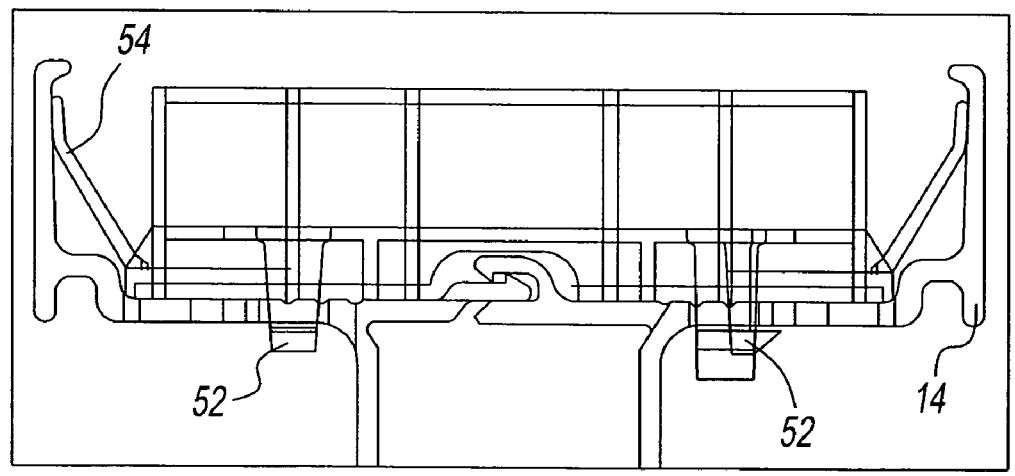
FIG. 3 is a end view of the busway housing with outlet attached showing engagement between housing and outlet.

FIG. 3 depicts wings 54 engage aluminum housing 14 to provide downward pressure. Outlet tabs 52 provide lateral and longitudinal positioning and locking of outlet 50 to aluminum housing 14.

While we have shown and described several embodiments in accordance with our invention, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A molded plastic outlet box for electric busway systems comprising:
   a molded plastic base comprising a plurality of press-fit tabs for attachment of said base to a housing of said electric busway system disposed about a bottom surface of said base; and
   a plurality of press-fit wings disposed on opposite sides of said base so that they are positioned adjacent to oppositely disposed sidewalls of said housing, said plurality of press-fit wings being configured to apply downward pressure to said molded plastic base when engaged with said electric busway system, wherein said press-fit tabs are disposed perpendicular to said base towards said housing, and wherein said housing includes thru-holes for securably receiving said press-fit tabs.

2. The molded plastic outlet box of claim 1, wherein said press-fit tabs are integrally molded together with said outlet box.

3. The molded plastic outlet box of claim 1, wherein said press-fit tabs are disposed about the four corners of said base.

4. The molded plastic outlet box of claim 1, wherein said press-fit tab comprises a post and an end tab for securably affixing said outlet box to said housing.

5. The molded plastic outlet box of claim 1, further comprising a gasket disposed between said base of said outlet box and an adjacent surface of said housing.

6. A molded plastic outlet box for electric busway systems comprising:
   a molded plastic base comprising a plurality of press-fit tabs for attachment of said base to a housing of said electric busway system disposed about a bottom surface of said base; and
   a plurality of press-fit wings disposed on opposite sides of said base so that they are positioned adjacent to oppositely disposed sidewalls of said housing, said plurality of press-fit wings being configured to apply downward pressure to said molded plastic base when engaged with said electric busway system, wherein said base comprises a planar surface at a top surface thereof, said planar surface having a plurality of slots extending therethrough coextensive with associated bus bar contact blades extending from said busway system, said base further including a pair of side members extending downwardly from said planar surface.

7. A molded plastic outlet box for electric busway systems comprising:

a molded plastic base comprising a plurality of press-fit tabs for attachment of said base to a housing of said electric busway system disposed about a bottom surface of said base; and a plurality of press-fit wings disposed on opposite sides of said base so that they are positioned adjacent to oppositely disposed sidewalls of said housing, said plurality of press-fit wings being configured to apply downward pressure to said molded plastic base when engaged with said electric busway system, wherein said base further comprises a molded plastic cover hingably and removably attached to one end of said top surface thereof by a hinge pin; and a pair of first arcuate projections integrally formed on said top surface at said one end, said hinge pin being trapped under said first arcuate projections in press-fit relation therewith for holding said cover in an open position on said one end of said top surface.

* * * * *

UNITED STATES PATENT AND TRADEMARK OFFICE
CERTIFICATE OF CORRECTION

PATENT NO. : 7,517,235 B2 Page 1 of 1
APPLICATION NO. : 11/647061
DATED : April 14, 2009
INVENTOR(S) : Bagewadi et al.

It is certified that error appears in the above-identified patent and that said Letters Patent is hereby corrected as shown below:

Title Page 4, in Field (56), under "FOREIGN PATENT DOCUMENTS", in Column 1, Line 10, delete "1028465" and insert -- 1028435 --, therefor.

Signed and Sealed this

Thirtieth Day of June, 2009

JOHN DOLL
*Acting Director of the United States Patent and Trademark Office*